United States Patent

[11] 3,592,168

| [72] | Inventor | George Claus |
| | | Stamford, Conn. |
| [21] | Appl. No. | 821,456 |
| [22] | Filed | May 2, 1969 |
| [45] | Patented | July 13, 1971 |
| [73] | Assignee | Offshore/Sea Development Corporation |
| | | New York, N.Y. |

[54] METHOD OF RAISING BIVALVES IN A CONTROLLED ENVIRONMENT
11 Claims, No Drawings

| [52] | U.S. Cl. | 119/4, 99/2, 99/3 |
| [51] | Int. Cl. | A01k 61/00 |
| [50] | Field of Search | 99/2, 3; 119/2, 3, 4 |

[56] References Cited
UNITED STATES PATENTS

| 1,608,688 | 11/1926 | Williamson | 99/3 |
| 2,631,937 | 3/1953 | Buss | 99/3 |
| 3,495,573 | 2/1970 | Vanderborgh | 119/4 |

*Primary Examiner* — Aldrich F. Medbery
*Attorney* — Ryder, McAulay & Hefter

ABSTRACT: Bivalves are fed with living blood cells prepared by adding an anticoagulant to whole blood, separating the blood cells from the plasma of the whole blood, and then washing the blood cells in a saline solution or filtered sea water. Additional steps are provided to prevent cell clumping and bacterial proliferation, and to stabilize the cell membrane and facilitate the dispersal of the cells in liquid.

METHOD OF RAISING BIVALVES IN A CONTROLLED ENVIRONMENT

BACKGROUND OF THE INVENTION

The present invention relates to artificial culturing and rearing of bivalves, and more particularly relates to a food, and a method of preparing such food, for utilization by bivalves.

There has long existed in the fishery industry the need for the development of appropriate foods and methods for use in the artificial culturing of bivalves, in order to supplement the declining natural production. There are many species of bivalves, some of those which are commercially utilized being oysters, clams and mussels. Bivalves are filter feeders having a shell composed of two corresponding movable pieces and requiring particulate material suspended in water. The morphology and physiology of the bivalves determine the mode of their food uptake, digestion, and utilization. Since there are no extracellular enzymes in their stomachs, with the possible exception of amylase, most bivalves are incapable of digesting food in their gastrointestinal tract. The digestive glands include cells, known as amoebocytes, for taking in the food particles by a process called phagocytosis. The amoebocytes measure about 30 microns. Because digestion occurs intracellularly, and the food particles are taken up by the amoebocytes through phagocytosis, the food particles must fall into a narrowly limited size range. Thus, bivalves are unable to utilize dissolved nutrients. In their natural environment bivalves generally consume small floating particles, planktonic algae or slowly sedimenting organic matter, all of which are present in large quantities in natural waters. Bivalves are highly prolific organisms. For instance, the American oyster may lay as many as 100 million eggs at a time, permitting the application of selective breeding techniques for obtaining disease resistant stocks with fast growth rates.

When growing bivalves in a controlled environment, one of the primary requirements is to supply an adequately nutritious food. The ideal bivalve food should not be of a small size as to clog the fine ciliary tracts which serve to direct the food towards the mouths, and should not be too large to prevent the amoebocytes from phagocytosing it. The ideal size range is estimated at from 4 to 20 micron diameter, making them amenable for uptake by the amoebocytes. It is also important that the bivalve food not contain intracellularly indigestible materials. Food containing cellulosic cell walls is unsuitable for feeding most bivalves, since cellulases, the enzymes that hydrolyze cellulose, are known to occur extracellularly. It is also desirable to have a bivalve food which is nutritionally complete, containing all essential amino acids, fats and carbohydrates. Materials such as starch grains only serve as a food supplement as they cannot provide for the total nutritional requirements of the bivalves.

Existing methods employed for culturing bivalves consist of either using upbloomed, centrifuged sea water alone, or such water with the addition of artificially raised marine flagellates. Other known methods, instead of using marine flagellates, employ small, live marine diatoms, a type of minute algae with silicified skeletons that form a light friable material. The feeding of larvae and adult bivalves with algae cultures and artificially raised marine flagellates, according to these existing methods, has been found to be a relatively inefficient and expensive method for raising bivalves. Other foods, such as pablum and corn flour, have also been tried in efforts to provide a more efficient and less expensive food material for bivalves. One problem associated with the use of corn flour was that the corn flour also served as a bacterial medium in which a large overgrowth of bacteria interfered with the normal growth of the larvae. Also, since such carbohydrates and starches do not fulfill the entire nutritional requirement of any organisms, essential amino acids must also be supplied to permit protein synthesis.

These and other recent techniques for rearing bivalves in controlled marine environments and on special diets have not succeeded in providing such bivalves with commercially adequate supplies of food at a low cost.

OBJECTS

It is an object of this invention to provide a method for the production of a food for consumption by bivalves which is suitable for rearing of such bivalves to maturity on a rapid and continuous basis.

It is another object to provide a method for the production of a food which fulfills essentially all of the nutritional requirements of bivalves and yet is relatively inexpensive.

It is a further object to provide a food which completely satisfies the nutritional requirements of bivalves and is relatively inexpensive.

SUMMARY OF THE INVENTION

These and other objects, which will become apparent from the detailed disclosure and claims to follow, are achieved by the present invention which provides a method of feeding bivalves which are maintained alive in a controlled environment, comprising feeding separated living blood cells to such bivalves. The blood cells are generally prepared from whole blood by adding an anticoagulant to the whole blood, separating the blood cells from the blood plasma, and washing the blood cells in a saline solution or filtered sea water. Additional steps for treatment of the blood cells are provided to prevent cell clumping and bacterial proliferation, and to impart membrane rigidity to the cells and facilitate their dispersal in liquids. Also provided by the present invention is a food concentrate for bivalves prepared by the method above.

It is to be understood that as used herein, the term "whole blood" is intended to mean the fresh whole blood from any vertebrate source which includes both the plasma and the formed elements consisting of red corpuscles, white cells and platelets. It is these corpuscular formed elements, comprising about 20 percent by weight of the "whole blood," which can be utilized in feeding larvae and adult bivalves.

It is also to be understood that the term "blood cells" is intended to mean living blood cells comprising the separated portion of the "whole blood" referred to above as the formed elements. Also, by "living" blood cells is meant blood cells which retain substantially all enzymatic activities.

DESCRIPTION OF THE PREFERRED EMBODIMENTS

From the standpoint of size, digestion, nutrition and economy, it has been found that vertebrate blood cells are an ideal food for bivalves. Blood cells generally vary from 4 to 12 microns in diameter, depending upon their source. It is to be pointed out that there are a few animals which have blood cells of over 30 microns diameter and, therefore, will not be considered as a food source. Blood cells consist of individual particles falling exactly in the size range that can be most easily utilized by bivalves; they are not so small as to clog their ciliary tracts and yet are not so large as to present problems for phagocytosis by the digestive glands. Also, blood cells do not have a cell wall but are surrounded only with a lipoproteinaceous membrane thereby making such blood cells an easily digestible food which can be completely broken down in the amoebocytes. The fact that the blood cells comprise very low amounts of undigestible material is believed to be partly responsible for the improved growth rate of bivalves since some of the energy otherwise utilized in catabolic processes for the elimination of waste products is instead channeled into constructive metabolism. In other words, feeding bivalves a highly nutritious diet with very low amounts of undigestable material is believed to speed up the rate of growth. In addition, blood cells contain all the constituents necessary for completely satisfying the nutritional requirements of bivalves and are therefore a more suitable food than any plant product in that they contain all of the essential amino acids in proper proportions. Besides proteins, blood cells have considerable amounts of desirable carbohydrates in the form of glycogen, and also other substances such as fats.

According to the method of the invention, an anticoagulant, such as citrate, cumarine, heparine or oxalate, is added to the whole blood which is to be used as the source of the bivalve food, in order to prevent coagulation, which can be defined as an enzymatic reaction occurring in whole blood when exposed to air or when contacting certain materials whereby the whole blood forms a coherent mass.

Whole blood, in its present form, is not suitable for utilization by bivalves since whole blood coagulates and forms large masses, and the plasma proteins in the whole blood serve as an excellent medium for bacterial growth and also cause the individual blood cells to stick together or clump. Therefore, the blood cells must be separated from the whole blood. Separation is generally accomplished by either centrifuging the whole blood or by a sedimentation process whereby the settling of the whole blood results in the separation of the plasma from the particulate blood cells.

The blood cells must be protected from contact with fresh water so as to prevent hemolysis whereby the cell membrane breaks and most of the nutrients, including hemoglobin, are liberated from the red blood cells and lost in solution. While red blood cells will ordinarily undergo hemolysis in fresh water, sea water provides sufficient salinity to produce an osmotic pressure in the sea water to prevent hemolysis occurring in the red blood cells. Besides sea water, a saline solution, or any other isosmotic solution which provides an osmotic pressure at least equal to the pressure of the red blood cells, is suitable for the purpose of preventing hemolysis. Thus, the red blood cells, when introduced into either sea water or an isosmotic solution, will retain their individual particle identity and the membrane will not rupture and turn into ghosts unsuitable for uptake by the bivalves.

Plasma proteins have the tendency of intimately absorbing or clinging onto blood cells. Even after the blood cells are separated from the plasma, the attached plasma proteins will prevent the easy dispersion of the blood cells in liquids as desired for efficient utilization by the bivalves. That is, when the separated blood cells are introduced into a solution, isosmotic or nonisosmotic, they will tend to form clumps. Therefore, it is important that the blood cells, in addition to their being separated from the whole blood, be also individual blood cells which will not attach to each other when placed in a solution. Washing the blood cells will remove plasma proteins which cause clumping, while at the same time the use of sea water or other isosmotic solution will prevent hemolysis otherwise occurring in the presence of fresh water.

One preferred method of washing the blood cells comprises alternately suspending the blood cells comprises alternately suspending the blood cells in normal saline and centrifuging at a suitable speed over several cycles so as to wash off the adhered plasma proteins. As noted previously, washing can instead be carried out with filtered sea water or other isosmotic solution. It is to be pointed out that these plasma proteins are not to be confused with the proteins found in the blood cells and utilized by the bivalves.

While the washing will remove a major portion of the plasma proteins which cause clumping, such washing will not effect complete dispersal of the blood cells in liquids because of the natural affinity of corpuscular membranes for each other. Therefore, as an additional measure for preventing clumping, the blood cells are coated with tannic acid or other suitable tanning agent to produce a monomolecular adsorption structure on the surface of the blood cells. A final washing cycle carried out with an 0.1 percent solution of tannic acid has the effect of (a) increasing the membrane rigidity so that the blood cells can withstand longer periods of storage without undergoing hemolysis, and (b) imparting identical electrical charges to each cell membrane causing them to become mutually repulsive, thus improving their dispersal in liquids.

A further problem associated with the use of blood cells is that it is an excellent medium for bacterial growth. To prevent the occurrence of bacterial proliferation, the prepared blood cells are refrigerated. Where the blood cells are to be refrigerated and stored for long periods of time, such as two days or more, a chemical preservative, such as a 1:2000 solution of Merthiolate, can be added thereto. As a further measure, an antibiotic mix, such as streptomycin-tetracycline (neomycine), can be added to eliminate the occurrence of bacterial contamination in the blood cells and also in the areas where the bivalves are located.

While the blood cells do provide all the essential nutrients for bivalves, it may be desirable to supplement the blood cell diet with starch grains thereby increasing the carbohydrate content and fattening the bivalves. When the bivalves attain a marketable size, they are removed from the culturing environment and either sold or transferred to clean, cold waters.

EXAMPLE

Whole blood containing cells of suitable size was citrated to prevent clotting. Next the whole blood was centrifuged at a speed of about 6,000 r.p.m. until the plasma separated from the blood cells. After separation, the blood cells were alternately suspended in normal saline and centrifuged at 18,000 r.p.m. for 5 cycles to wash off the adhered plasma proteins. The blood cells were then washed with an 0.1 percent tannic acid solution and added to a culture consisting of approximately 25,000 oyster larvae, each having a diameter of about 14 millimeter, and placed in plastic trays in which sea water was continuously circulated and aerated. The sea water was filtered to remove organisms and minute particles having a size above 2 microns. One cubic centimeter of these packed blood cells, totaling about 12 billion blood cells, were fed daily to the larvae. This amounted to about 500,000 blood cells per oyster. These blood cells were ravenously taken up by the larvae as proved by microscopic observation. At 24-hour intervals any blood cells not utilized by the larvae were removed from the trays. Ten larvae were randomly selected each day for the purpose of measuring their rates of growth. After a period of about 3 weeks, the larvae were transferred into setting trays having a nylon screen bottom and submerged in a bath of circulating sea water. At this time the daily blood cell diet was increased from 1 to two cubic centimeters for the 25,000 oyster larvae, amounting to about 1 million cells per each oyster. During the course of the culture period, a Merthiolate solution (1:2000) was added to the medium. It was found that this antiseptic, while it sufficiently controlled bacterial growth, did not adversely affect larvae behavior. Also, during the culturing period, the temperature of the bivalve environment was maintained between 27° and 31° C., preferably at 30° C.; while the salinity of the water was kept between 25 and 33 parts per thousand; preferably at 27 parts per thousand; and the pH between 7.0 and 7.4, preferably at 7.2.

In a 6-month period, the young oysters grew to a size of above 3 inches.

Two other groups of oysters were similarly cultured under the identical condition discussed above. The first of these two groups were young oysters, about 6 months old, while the second group consisted of 1 year old oysters. These oysters were cultured for a 6-month period and fed with higher concentrations of blood cells in accordance with the oyster size. The 6 month old group grew approximately 1 inch during the 6 month period, while the 1 year old group grew approximately three-fourths of one inch.

The results indicate that in 12 to 18 months, oysters will grow under the above environment to a marketable size of from 3 to 5 inches. This growth period is to be compared with the 4 to 5 years required to attain the same size in their northern natural environment. It is to be noted that one of the major factors responsible for the slow growth rate of the American oyster in natural waters is the low temperatures of the water in many areas during the winter months when the oysters slow their life activities, stop feeding and thus do not grow.

What I claim is:

1. The method of artificially culturing and rearing bivalves comprising the steps of:

a. providing a habitat of a saline solution,
b. placing bivalves in the saline solution; and
c. adding a quantity of separated blood cells to the habitat to provide nutriment for the feeding of the bivalves.

2. Method of feeding bivalves as recited in claim 1, wherein said blood cells are living blood cells.

3. Method of feeding bivalves as recited in claim 2, wherein said blood cells are substantially plasma protein free.

4. Method of feeding bivalves as recited in claim 2, wherein said blood cells are individual cells which will not attach to each other when introduced into said saline solution.

5. Method of feeding bivalves as recited in claim 1, wherein said saline solution is filtered sea water which is substantially free of organisms or minute particles above 2 microns particle size.

6. Method of feeding bivalves as recited in claim 5, wherein said sea water is maintained at a temperature of substantially between 27° to 31°C.

7. Method of feeding bivalves as recited in claim 5, wherein said sea water is maintained at a temperature of substantially 30°C.

8. Method of feeding bivalves as recited in claim 6, wherein said sea water is maintained at a pH of substantially between 7.0 to 7.4.

9. Method of feeding bivalves as recited in claim 6, wherein said sea water is maintained at a pH of substantially 7.2.

10. Method of feeding bivalves as recited in claim 8, wherein said sea water is maintained at a salinity of substantially between 25 and 33 parts per thousand (p.p.t.).

11. Method of feeding bivalves as recited in claim 8, wherein said sea water is maintained at a salinity of substantially 27 p.p.t.